United States Patent
Bruetsch

(10) Patent No.: US 8,425,241 B2
(45) Date of Patent: Apr. 23, 2013

(54) BUS BAR SYSTEM WITH SUPPORT MEANS FOR SPACING POLE RAILS

(75) Inventor: Friedbert Bruetsch, Tuttlingen (DE)

(73) Assignee: Friedbert Goehringer Elektrotechnik GmbH, Triberg (DE)

( * ) Notice: Subject to any disclaimer, the term of this patent is extended or adjusted under 35 U.S.C. 154(b) by 0 days.

(21) Appl. No.: 13/302,228

(22) Filed: Nov. 22, 2011

(65) Prior Publication Data
US 2012/0149225 A1 Jun. 14, 2012

(30) Foreign Application Priority Data

Dec. 8, 2010 (DE) .......................... 10 2010 053 745

(51) Int. Cl.
*H01R 13/46* (2006.01)
(52) U.S. Cl.
USPC .......................................... 439/114
(58) Field of Classification Search .......... 439/207, 439/211–214, 113, 142
See application file for complete search history.

(56) References Cited

U.S. PATENT DOCUMENTS

| | | | | |
|---|---|---|---|---|
| 4,820,178 A * | 4/1989 | Anderson et al. | ............. | 439/212 |
| 4,957,447 A * | 9/1990 | Hibbert et al. | ................ | 439/207 |
| 6,086,389 A * | 7/2000 | Wagener | ....................... | 439/114 |
| 7,656,648 B2 * | 2/2010 | Cant et al. | ..................... | 361/637 |
| 8,167,632 B2 * | 5/2012 | Bruetsch et al. | ............. | 439/114 |
| 2011/0287645 A1 * | 11/2011 | Bruetsch et al. | ............. | 439/114 |

FOREIGN PATENT DOCUMENTS

| DE | 20 2010 002 086 | 6/2010 |
|---|---|---|
| DE | 20 2010 006 964 | 11/2010 |

OTHER PUBLICATIONS

German Office Action for German Pat. Appln. No. 10 2010 053 745.4 mailed Sep. 30, 2011, 5 pages (4 pgs.—German citing DE 20 2010 006 964 and DE 20 2010 002 086; 1 pg.—English of DE Examiner's comments regarding references).

* cited by examiner

*Primary Examiner* — Chandrika Prasad
(74) *Attorney, Agent, or Firm* — Andrew F. Young, Esq.; Lackenbach Siegel, LLP

(57) ABSTRACT

A bus bar system is provided with a base part made of an insulating material, in which the base part exhibits at least two chambers for receiving one pole rail each in which one chamber partition is disposed between two chambers respectively, in which structures are provided which arrange corresponding pole rail for the pole rails disposed on the one side of the chamber partition and for the pole rails disposed on the other side of the chamber partition, wherein these structures are a distance from the chamber partition as formed.

20 Claims, 3 Drawing Sheets

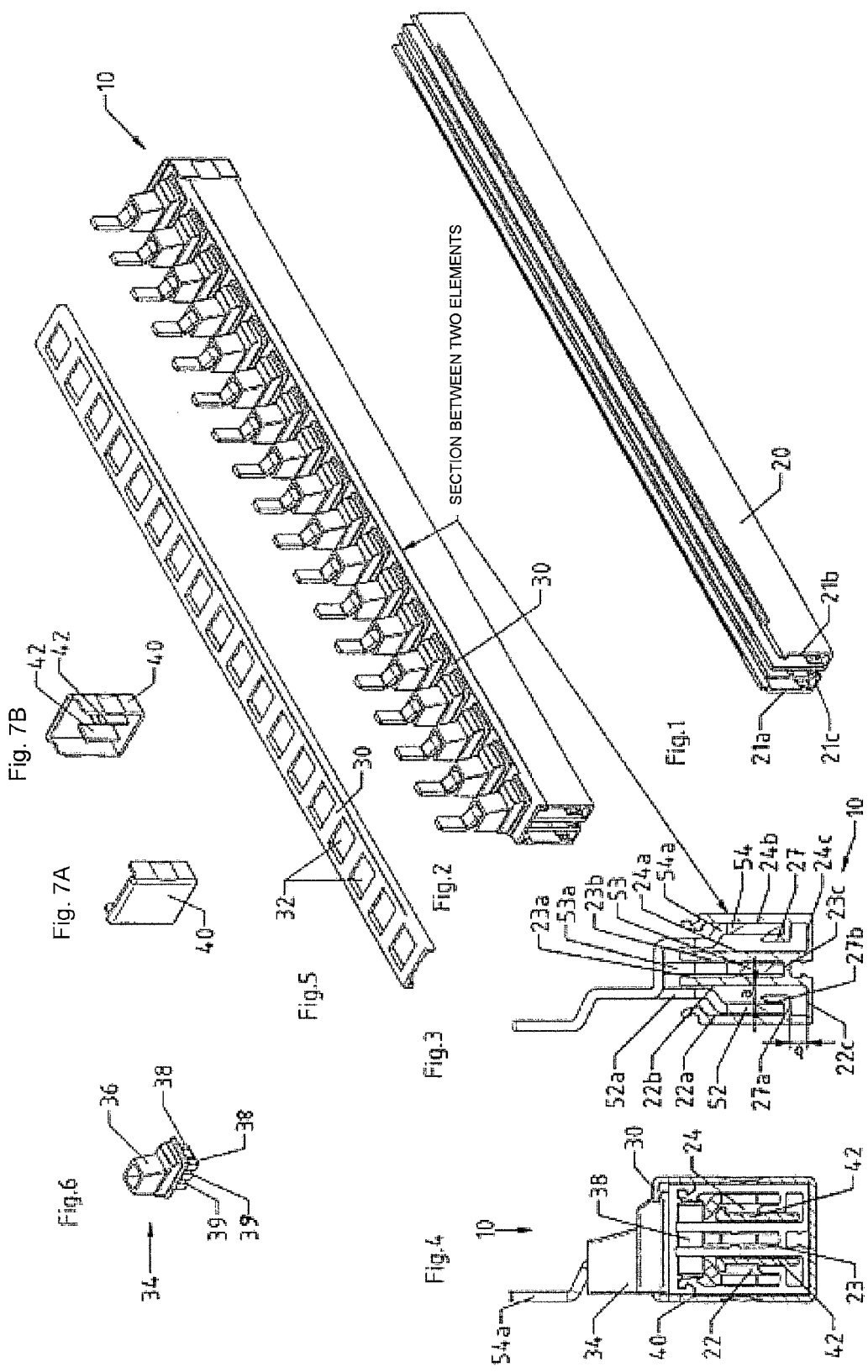

BUS BAR SYSTEM WITH SUPPORT MEANS FOR SPACING POLE RAILS

CROSS REFERENCE TO RELATED APPLICATIONS

This application claims priority from German Ser. No. DE 10 2010 053 745.4 filed Dec. 8, 2011, the entire contents of which are herein incorporated by reference.

FIGURE SELECTED FOR PUBLICATION

FIG. 3

BACKGROUND OF THE INVENTION

1. Field of the Invention

The present invention relates to a bus bar system. More particularly, the present invention relates to bus bar system and method for assembling the same where a chamber partition is provided including a means for arranging pole rails relative to the chamber partition.

2. Description of the Related Art

Bus bars are known with a base part made of an insulating material, in which the base part exhibits at least two chambers for receiving a pole rail, in which a chamber partition is disposed respectively between the two chambers.

Such bus bars are often made available in a ready-made length, which does not, offer the user an opportunity to adjust the length of the bus bar on site to the appropriate conditions. Should the possibility be providing of adjusting the length of the bus bar on site, the insulating properties further have to be ensured in order not to endanger the user.

It is, in particular, desirable that the bus bars also meet the prerequisites of the American standard UL 508 after adjusting to length, which requires an air gap of at least 9.5 mm and a creep distance of at least 12.7 mm for such a component. Here, the air gap is defined as the shortest distance in air between two electrically conducting parts. The creep distance is defined as the shortest distance along the surface of an insulating material between two conducting the parts.

The patent DE 20 2010 002 U1, the entire contents of which are incorporated herein by reference, discloses a bus bar which can be adjusted to length on site. At the same time, an adjustment to length is only possible, however, with predetermined spacing units, whereby the flexible use of the bus bar is greatly limited.

Accordingly, there is a need for an improved bus bar system which must also meet UL 508 and which overcomes the strong disadvantages of the prior art and makes available an improved bus bar system and method of assembling the same.

ASPECTS AND SUMMARY OF THE INVENTION

The proposed invention provides a bus bar system is provided with a base part made of an insulating material, in which the base part exhibits at least two chambers for receiving one pole rail each in which one chamber partition is disposed between two chambers respectively, in which structures are provided which arrange, guide, or support corresponding pole rail for the pole rails disposed on the one side of the chamber partition and for the pole rails disposed on the other side of the chamber partition, wherein these structures are a distance from the chamber partition as formed. The proposes structure may be adaptively arranged, supported, or guided so that a bus bar having only two chambers may work with two pole rails (one pole rail in each chamber) and also with one pole rail disposed on one side of a chamber partition and another pole rail disposed on the other side of the chamber partition. It will be recognized that the proposed invention may operate with one or more pole rails having differing shapes and with one or more bus bar arrangements, guides, or supports having two or more chambers adaptively modified according to aspects of the proposed invention.

The bus bar according to the invention with a base part made of an insulating material, in which the base part exhibits at least two chambers for receiving a pole rail each, in which one chamber partition is disposed respectively between two chambers, is distinguished as a result, for the first pole rail disposed on the one side of the chamber partition and/or for the second pole rail disposed on the other side of the chamber partition, by means being provided which arrange, guide, or support the first and/or the second pole rail over the total extent of the bus bar at a distance from the chamber partition. In this way, the distance between two adjacent pole rails is increased, so that the air gap and the creep distance are also increased altogether.

According to an advantageous embodiment of the invention, the means are constructed as an additional pole rail disposed, at a distance from the chamber partition, between the chamber partition and the pole rail disposed in the chamber. According to an alternative preferred embodiment of the invention, the means are constructed as an L-shaped element disposed at the side wall of the chamber lying opposite the chamber partition, in which the L-shaped element is disposed with the free end of its cross-leg toward the side wall of the chamber. Both variants allow the pole rails to be simply made in an extrusion process and fastened in any reliable manner at a distance from the chamber partition, so that the distance separating two adjacent pole rails is increased.

According to an especially preferred embodiment of the invention, the cross-leg of the L-shaped element to be spaced some distance from the floor of the chamber in order to further increase the creep distance between two adjacent pole rails.

Preferably, the base part can be closed at the front by two closure caps, which on the one hand makes possible the manufacture of the base part in an extrusion process, and on the other hand meets the requirements for insulation.

According to an especially preferred embodiment of the invention, on the inside of at least one of the closure caps is disposed at least one insulation strip, which, in the inserted state at the base part, enters into in a space between the pole rail disposed in the chamber and the chamber partition. In this way, the air gap between two adjacent pole rails is significantly increased and makes it possible, in particular, for the bus bar to be able to meet the requirements of UL 508.

According to a preferred embodiment of the invention, a top part is provided which can be set onto the base part such that the pole rails are covered and connection clips disposed on the pole rails project through openings into the top part. It is thereby made possible for the bus bars, aside from the free ends of the connection clips, to insulate especially well.

Preferably, an insulating element can be inserted into one opening, which in the inserted state passes through the opening and which exhibits a casing on which is disposed at least one partition, preferably two partitions, which is positioned between two adjacent connection clips if the top part is set onto the base part and the insulating element is inserted into the opening. The casing isolates the connection clip projecting through the opening into the top part on the outside, on the one hand facing the adjacent connection clip and on the other hand facing the user, while the partition isolates the connection clip on the inside of the bus bar from one another, so that in this way the desired creep distance can be attained.

According to one alternative embodiment of the present invention there is provided a bus bar system, comprising: a base part formed of an operably insulating material, the base part continuously defining at least two chambers separated by a chamber partition interposed there between, at least one pole rail operably positioned in each the chamber, a support means in each the chamber operably receiving respective the pole rail, the support means continuously extending from the base part and spacing each respective the pole rails a first predetermined distance from the chamber partition and a second predetermined distance from a chamber floor, whereby each the pole rail is spaced from the chamber partition and the chamber floor.

According to another alternative embodiment of the present invention there is provided a method for assembling a bus bar system, comprising the steps of: (a) providing a base part formed of an operably insulating material, (i) the base part continuously defining at least two chambers separated by a chamber partition interposed therebetween, and (b) positioning at least one pole rail operably in each the chamber, (c) receiving respectively the pole rail on a support means in each the chamber, the support means continuously extending from the base part and spacing each respective the pole rails a first predetermined distance from the chamber partition and a second predetermined distance from a chamber floor, whereby each the pole rail is spaced from the chamber partition and the chamber floor.

According to another alternative embodiment of the present invention, there is provided a bus bar system, comprising: a base part made of a insulating material, the base part comprising at least two chambers, each the chamber being operable for receiving one pole rail each, a chamber partition disposed between each the two chambers, a pole rail disposed in each the chamber, arrangement means in each the chamber operable to arrange the corresponding pole rails over an operable extent of the bus bar at a distance from the chamber partition.

The above, and other aspects, features and advantages of the present invention will become apparent from the following description read in conduction with the accompanying drawings, in which like reference numerals designate the same elements.

BRIEF DESCRIPTION OF THE DRAWINGS

FIG. 1 is a perspective view of a base part of a bus bar system according to the present invention.

FIG. 2 is a perspective view of a bus bar with the base part according to FIG. 1.

FIG. 3 is an exemplary a longitudinal section through the bus bar according to FIG. 2 without the top part and closure caps.

FIG. 4 is an exemplary longitudinal section through the bus bar according to FIG. 2 with the top part set on and closure caps set on.

FIG. 5 a perspective view of the top part of the bus bar according to FIG. 2.

FIG. 6 a perspective view of an insulating element installed on the top part of a bus bar system according to the present invention.

FIGS. 7A and 7B provide perspective views of the closure caps.

DETAILED DESCRIPTION OF THE PREFERRED EMBODIMENTS

Figure 8:
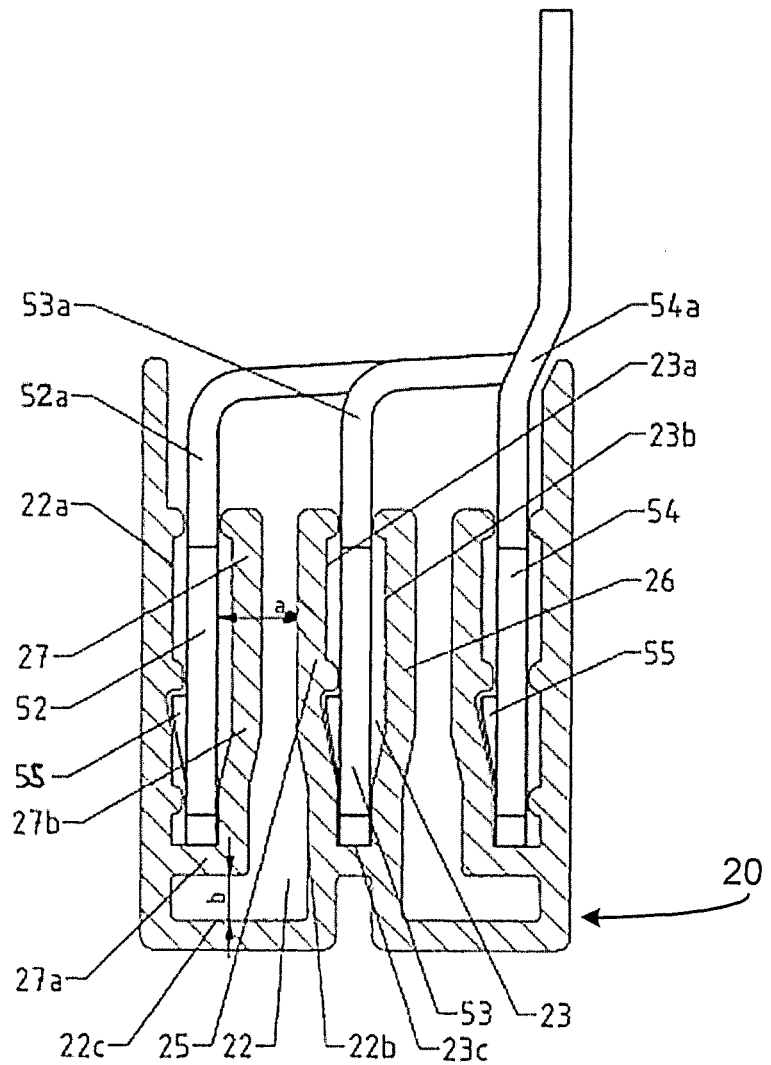
FIG. 8 a sectional view of a further embodiment example of a bus bar system according to the invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Referring now to FIGS. 1 through 7 which show different views of a first embodiment example of a bus bar 10 with a base part 20 (See FIG. 1), a top part 30 (See FIG. 5), and two front closure caps 40, 40 (See FIGS. 7A, 7B).

Base part 20 and top part 30 are made of an electrically insulating material and in particular are manufactured in an extrusion process. Base part 20 exhibits two side walls 21a, 21b running essentially in parallel and a floor 21c and is open to one side, which can be covered by top part 30. Base part 20 exhibits three chambers 22, 23, 24, in which a chamber partition 25, 25 is disposed between each two chambers 22, 23 and 23, 24.

In the first chamber 22 is a first insertable pole rail 52 which exhibits in the longitudinal direction connection clips 52a disposed and set against one another. In the second chamber 23 is a second insertable pole rail 53 which exhibits connection clips 53a separated from one another in the longitudinal direction. In the third chamber 24 is a third insertable pole rail 54 which exhibits connection closures 54a set apart from one another in the longitudinal direction. Connection clips 52a, 53a, 54a are offset in their connection area such that they are lined up longitudinally with the pole rail 10 aligned with one another (See FIG. 2).

The open side of the base part 20 can be covered by the top part 30 in order to cover the pole rails 52, 53, 54, into which the connection clips 52a, 53a, 54a project through openings 32 into the top part 30. If top part 30 is manufactured in an extrusion process, the opening 32 can then be punched in, whereby the desired distance between the openings 32 and consequently between the connection clips 52a, 53a, 54a can be attained in a simple way during an assembly step.

During further assembly steps, into each of the openings 32 an insulating element 34 (see FIG. 6, in particular) can be inserted, which, in the inserted state, passes through the opening 32. The insulating element 34 exhibits a casing 36 and two partitions 38, 38 disposed thereon 36. In the inserted state, the casing 36 is located on the outside of the top part 30, while the partition 38 is disposed on the inside of the bus bar 10. The casing 36 and the partition 38 isolate the connection clips 52a, 53, 54a from one another. The partitions 38 each exhibit two slits 39, into which the upper edge of the partition 25, 26 passes if the insulating element 34 with the top part 20 is set on the base part.

During an assembly process, if it is desired to adjust the bus bar 10 to length during assembly on site, it is desirable, after adjustment to length, that the specified requirements for the air gap and creep distance between the electrically conducting elements, that is, between the pole rails 52, 53, 54, be met.

The first chamber 22 exhibits two side walls 22a, 22b and a floor 22c. The second chamber 23 exhibits two side walls 23a, 23b and a floor 23c. The third chamber 24 exhibits two side walls 24a, 24b and a floor 24c. The one side of the chamber partition 25 is simultaneously formed by the side wall 22b of the first chamber 22, while the other side of the chamber partition 25 is formed by the side wall 23a of the second chamber 23. One side of the chamber partition 26 is formed by the side wall 23b of the second chamber 23, while the other side of the chamber partition 26 is formed by the side wall 24a of the third chamber 25.

The width of the middle chamber 23 is in the present embodiment examples measured such that the second pole rail 52 is held wedged into it and in particular offers contact with both side walls 23a, 23b. In order to increase the air gap between the second pole rail 53 and the first pole rail 52, means, such as support structures, are provided which hold the first pole rail 52 in the first chamber 22 over the entire extent of the bus bar 10 at some distance a to the chamber partition 25.

As described optionally herein as a non-limiting example, the means are constructed as an L-shaped element 27 with a cross-leg 27a and a long leg 27b, whereby the L-shaped element 27 is disposed with the free end of the cross-leg 27a on the side wall 24a of the first chamber 22, in particular such that a pocket-like recess is formed, into which the first pole rail 52 can be inserted. The width of the L-shaped element 27 is smaller than the width of the first chamber 22. The L-shaped element 27 causes the pole rails 52 to have no contact, at any place on its extent on the bus bar 10, with the side wall 22b of the first chamber 22 and thus none with one side of the chamber partition 25. The L-shaped element 27 is disposed at a distance b from the floor 22c of the first chamber, whereby the creep distance between the pole rail 52 disposed in the first chamber 22 and the second pole rail 53 disposed in the second chamber 23 is further increased. The desired length of the air gap and creep distance are attained by means of this arrangement and further the pole rails are positioned resistant to unintended movement or misalignment during later assembly steps.

Preferably and optionally, corresponding means are provided which hold the third pole rail 54 in the third chamber 24 at a distance a from the chamber partition 26, in order to attain the desired length of the air gap and creep distance between the second pole rail 53 and the third pole rail 54.

During a further assembly step, the air gap between two adjacent pole rails 52, 53 or 53, 54 are further increased, on the inside of the closure caps 40, are disposed insulation strips 42 which passes into the space formed by the distance a between the first pole rail 52 and the chamber partition 25 starting at the front surface of the base part 20 or between the third pole rail 54 and the chamber partition 26.

During assembly, the closure caps 40 pass above the base part 20 on the outside and can in particular be held wedged or locked on base part 20.

Figure 9:
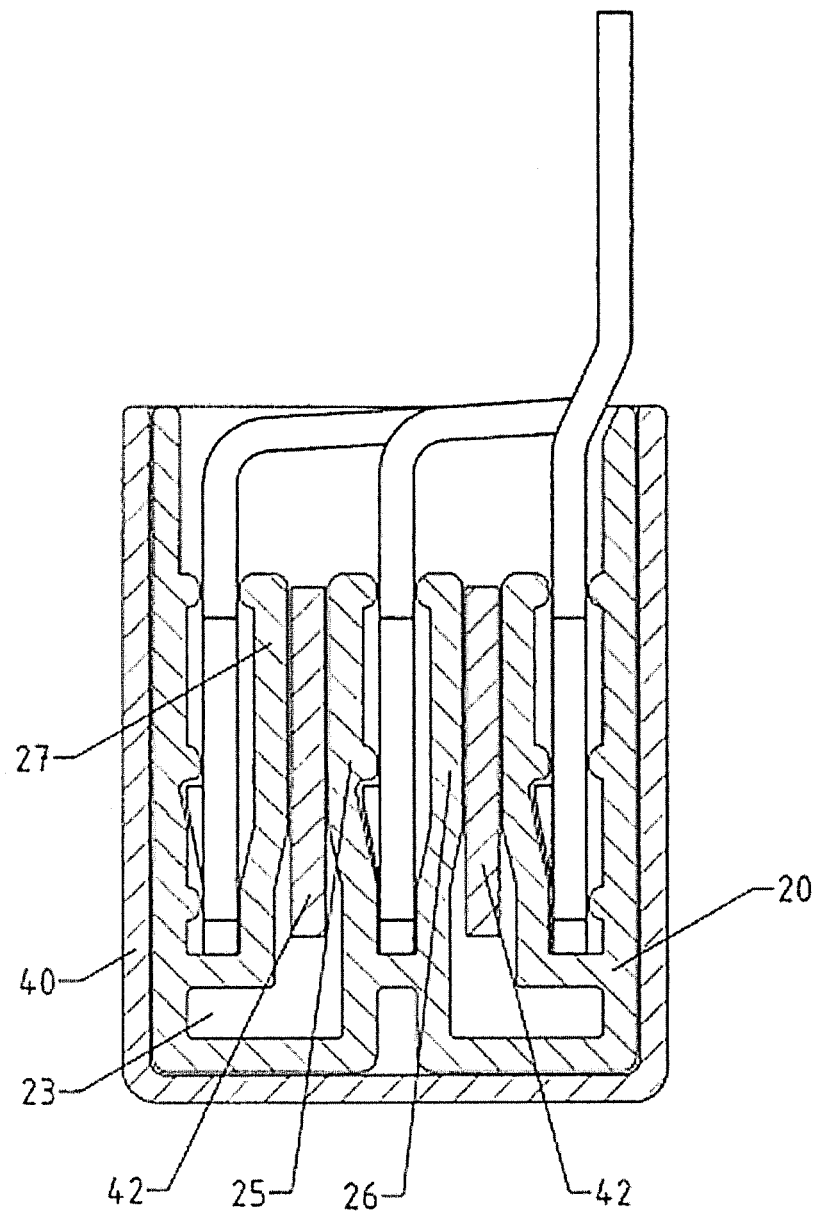
FIG. 9 a further sectional view of through the bus bar according to FIG. 8.

Referring now to FIGS. 8 and 9, which depict an optional front view and a section through a further alternative and non-limited embodiment example of a bus bar 10', which mainly differs thereby from the first embodiment example of the bus bar 10, in that the length of the long legs 27b of the L-shaped elements 27 is greater than in the first embodiment example and reaches approximately up to the upper corner of the partition 25, 26. In addition, the pole rails 52, 53, 54 exhibit locking elements 55, with which they lock into the chambers 22, 23, 24 for better fastening in the vertical direction.

The base part 20 according to both embodiment examples exhibits the same cross-section over the entire extent and can thus in particular be manufactured in an extrusion process, which makes an especially cost-effective manufacturing process possible. Flexible adjustment to length of the base part 20 at any desired position is possible, moreover. By means of the profile of the base part 20 according to the invention, however, the desired air gap and creep distance are also attained after adjustment to length to any desired position of the base part 20 and the requirements for the insulation properties are ensured. In particular, it is also possible to meet the requirements according to UL 508.

| Reference List | |
|---|---|
| 10 | Bus bar |
| 10' | Bus bar |
| 20 | Base part |
| 21a | Side wall |
| 21b | Side wall |
| 21c | Floor |
| 22 | First chamber |
| 22a | Side wall |
| 22b | Side wall |
| 22c | Floor |
| 23 | Second chamber |
| 23a | Side wall |
| 23b | Side wall |
| 23c | Floor |
| 24 | Third chamber |
| 24a | Side wall |
| 24b | Side wall |
| 24c | Floor |
| 25 | Chamber partition |
| 26 | Chamber partition |
| 27 | L-shaped element |
| 27a | Cross leg |
| 27b | Long leg |
| 30 | Top part |
| 32 | Opening |
| 34 | Isolating element |
| 36 | Casing |
| 38 | Partition |
| 39 | Slit |
| 40 | Closure cap |
| 42 | Insulation strip |
| 52 | First pole rail |
| 52a | Connection clip |
| 53 | Second pole rail |
| 53a | Connection clip |
| 54 | Third pole rail |
| 54a | Connection clip |
| 55 | Locking element |
| a | Distance |
| b | Distance |

It will be understood by those of skill in the art that the phrases arrange, support, and or guide as used with regards to said pole rail members and the positioning thereof, that such phrases are non-limiting and may be interchangeably used based upon what gravity field the bus bar system is positioned within. For example, horizontal to a gravity field, the arrangement or support members would support the pole rails, whereas vertical to the gravity field, the arrangement operably serves as a guide with the weight being born by other elements in the bus bar system.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A bus bar system, comprising:
    a base part formed of an operably insulating material;
    said base part continuously defining at least two chambers separated by a chamber partition interposed there between;
    at least one pole rail operably positioned in each said chamber;
    a support means in each said chamber operably receiving respective said pole rail;
    said support means continuously extending from said base part and spacing each respective said pole rails a first predetermined distance from said chamber partition and a second predetermined distance from a chamber floor, whereby each said pole rail is spaced from said chamber partition and said chamber floor.

2. A bus bar system, according to claim 1, wherein:
    each said support means in each said chamber projects outwardly from a wall of said chamber.

3. A bus bar system, according to claim 2, wherein:
    each said support means is formed as a generally L-shaped element having a free end; and
    each said free end including a portion extending parallel to a respective side wall of each said chamber.

4. A bus bar system, according to claim 3, wherein:
    said base part extends from a first open end to a second open end;
    said bus bar system further comprising a first closure cap operably engageable with said first open end and a second closure cap operably engagable with said second open end, whereby respective said first and second ends are closed.

5. A bust bar system, according to claim 4, further comprising:
    at least one insulation strip on at least one of said first and said second closure caps;
    said at least one insulation strip operably projecting from said respective closure cap and into one of said at least two chambers following an engagement with said base part; and
    said at least one insulation strip in said base part spacing respectively at least one of said respective pole rails from a proximate side of said chamber partition.

6. A bus bar system, according to claim 4, further comprising:
    a top part extending from said first open end to said second open end;
    each said pole rail including at least one connection clip projecting therefrom away from said base part;
    said top part including a plurality of openings operably receiving respective said at least one connection clips for each said pole rail; and
    said top part operably securing respective pole rails in said base part.

7. A bus bar system, according to claim 6, further comprising:
    at least one insulating element defining a bounded opening there through operably shaped to receive said at least one connection clip projecting from said at least one pole rail; and
    each said insulating element including a projecting partition projecting away from said bounded opening and operably insertable within one of said plurality of openings in said top part during an assembly therewith.

8. A bus bar system, according to claim 3, further comprising:
    a third chamber in said base part; and
    said third chamber in said chamber partition.

9. A bus bar system, according to claim 8, further comprising:
    a pole rail in said third chamber;
    walls of said chamber partition extending from said chamber floor; and
    portions of said walls extending parallel to said portions of said free ends of each said support means extending parallel to said respective side walls of each said chamber.

10. A method for assembling a bus bar system, comprising the steps of:
    (a) providing a base part formed of an operably insulating material;
        (i) said base part continuously defining at least two chambers separated by a chamber partition interposed therebetween; and
        (ii)
    (b) positioning at least one pole rail operably in each said chamber;
    (c) receiving respectively said pole rail on a support means in each said chamber; and
        (i) said support means continuously extending from said base part and spacing each respective said pole rails a first predetermined distance from said chamber partition and a second predetermined distance from a chamber floor, whereby each said pole rail is spaced from said chamber partition and said chamber floor.

11. A method for assembling a bus bar system, according to claim 10, wherein:
    each said support means in each said chamber projects outwardly from a wall of said chamber;
    each said support means is formed as a generally L-shaped element having a free end;
    each said free end including a portion extending parallel to a respective side wall of each said chamber; and
    said base part extending from a first open end to a second open end.

12. A method for assembling a bus bar system, according to claim 11, further comprising the steps of:
    (d) providing a first closure cap operably engageable with said first open end and a second closure cap operably engagable with said second open end;
    (e) securing said first and said second closure caps to said bus bar;
        (i) at least one insulation strip on at least one of said first and said second closure caps;

(ii) said at least one insulation strip operably projecting from said respective closure cap and into one of said at least two chambers following an engagement with said base part; and (iii) said at least one insulation strip in said base part spacing respectively at least one of said respective pole rails from a proximate side of said chamber partition.

13. A method for assembling a bus bar system, according to claim 12, further comprising the steps of:

(f) providing a top part extending from said first open end to said second open end;

(i) each said pole rail including at least one connection clip projecting therefrom away from said base part;

(ii) said top part including a plurality of openings operably receiving respective said at least one connection clips for each said pole rail; and (g) securing said top part operably securing respective pole rails in said base part.

14. A method for assembling a bus bar system, according to claim 13, further comprising the steps of:

(h) providing at least one insulating element defining a bounded opening there through operably shaped to receive said at least one connection clip projecting from said at least one pole rail;

(i) each said insulating element including a projecting partition projecting away from said bounded opening and operably insertable within one of said plurality of openings in said top part during an assembly therewith; and (i) assembling said insulating element with said pole rail and said base member.

15. A bus bar system, comprising:

a base part made of a insulating material;

said base part comprising at least two chambers;

each said chamber being operable for receiving one pole rail each;

a chamber partition disposed between each said two chambers, a pole rail disposed in each said chamber;

arrangement means in each said chamber operable to arrange said corresponding pole rails over an operable extent of said bus bar at a distance from said chamber partition.

16. A bus bar system, according to claim 15, wherein:

said arrangement means are operably shaped as an additional partition disposed at some distance from the chamber partition between the chamber partition and the pole rails disposed in the chambers.

17. A bus bar system, according to claim 16, wherein:

said arrangement means are constructed as an L-shaped element projecting from of the chamber partition and disposed lying opposite the side wall of the chamber, whereby the L-shaped element is disposed with the free end of its cross-leg at the side wall of the chamber.

18. A bus bar system, according to claim 17, wherein:

a cross-leg of each said L-shaped element is separated a distance from a floor of the chamber.

19. A bus bar system, according to claim 18, further comprising:

a first closure cap and a second closure cap;

said closure caps on distal ends of said base part and operably closing the same; and on an inside of at least one closure cap is disposed at least one isolation strip, operably positioned in a space between the pole rail disposed in each said chamber and the chamber partition.

20. A bus bar system, according to claim 19, further comprising:

a top part positioned on said base part and defining a plurality of openings for receiving a respective connection clip member projecting from each said pole member; and said insulating elements positioned in each said opening and partially passing there through as an insulating element.

* * * * *